United States Patent
Yu et al.

(10) Patent No.: US 9,135,956 B2
(45) Date of Patent: Sep. 15, 2015

(54) METHOD AND COMPUTER PROGRAM PRODUCT FOR ESTABLISHING PLAYBACK TIMING CORRELATION BETWEEN DIFFERENT CONTENTS TO BE PLAYBACKED

(71) Applicant: Realtek Semiconductor Corp., Hsinchu (TW)

(72) Inventors: Siu-Leong Yu, Hsinchu County (TW); Shih-Chun Wei, Hsinchu County (TW); Chen Ma, San Jose, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 121 days.

(21) Appl. No.: 14/133,021

(22) Filed: Dec. 18, 2013

(65) Prior Publication Data
US 2014/0169766 A1    Jun. 19, 2014

Related U.S. Application Data

(60) Provisional application No. 61/738,406, filed on Dec. 18, 2012.

(51) Int. Cl.
*H04N 5/93* (2006.01)
*G11B 27/00* (2006.01)
*G11B 27/10* (2006.01)
*H04N 5/76* (2006.01)
*G11B 27/034* (2006.01)
*G11B 27/34* (2006.01)
*H04N 21/8547* (2011.01)
*H04N 5/445* (2011.01)

(52) U.S. Cl.
CPC .............. *G11B 27/10* (2013.01); *G11B 27/034* (2013.01); *G11B 27/34* (2013.01); *H04N 5/44591* (2013.01); *H04N 5/76* (2013.01); *H04N 21/8547* (2013.01)

(58) Field of Classification Search
USPC ........................................ 386/278–283, 248
See application file for complete search history.

(56) References Cited

U.S. PATENT DOCUMENTS

| | | | | |
|---|---|---|---|---|
| 6,658,194 | B1 * | 12/2003 | Omori ........................... | 386/284 |
| 7,024,095 | B1 * | 4/2006 | Kondou et al. ................ | 386/279 |
| 7,073,127 | B2 * | 7/2006 | Zhao et al. .................... | 715/719 |
| 2010/0260468 | A1 * | 10/2010 | Khatib et al. ................... | 386/52 |

\* cited by examiner

*Primary Examiner* — Nigar Chowdhury
(74) *Attorney, Agent, or Firm* — Birch, Stewart, Kolasch & Birch, LLP

(57) ABSTRACT

A method and a computer program product for controlling a timing correlation establishing device to establish playback timing correlation between different contents to be playbacked are disclosed. The method includes displaying a main event block corresponding to a main video clip; displaying an auxiliary event block corresponding to an auxiliary video clip; displaying a time marker on a location of a first time point on a timeline according to an editor's manipulation to an input device; and when the time marker is positioned on the location of the first time point, if the editor perform a set of predetermined manipulations to the input device, utilizing a control circuit to establish a first trigger timing data for indicating that an auxiliary display device has to begin playbacking the auxiliary video clip when the main video clip playbacked by a main display device reaches the first time point.

38 Claims, 13 Drawing Sheets

METHOD AND COMPUTER PROGRAM PRODUCT FOR ESTABLISHING PLAYBACK TIMING CORRELATION BETWEEN DIFFERENT CONTENTS TO BE PLAYBACKED

CROSS-REFERENCE TO RELATED APPLICATIONS

This application claims the benefit of priority to U.S. Provisional Application Ser. No. 61/738,406, filed on Dec. 18, 2012; the entirety of which is incorporated herein by reference for all purposes.

BACKGROUND

The disclosure generally relates to a multimedia control method and, more particularly, to a method and computer program product for establishing playback timing correlation between different contents to be playbacked in a multi-screen multimedia playback system.

In general, when making movies or TV programs, the movie producer or TV producer typically employs multiple cameras to capture images from different viewing angles. However, traditional video playback systems are single-screen systems. No matter the audiences choose to watch movies in the movie theaters or choose to watch videos or TV programs at home by using a home theater system, they can only watch the video or TV programs through the pre-installed single screen.

Therefore, in order to simultaneously display images of different viewing angles in the traditional video playback systems, the movie producer or TV producer may display the images of different viewing angles on the same screen by adopting a split-screen approach or display the images of different viewing angles in turns, i.e., display the images of different viewing angles one after another. Apparently, it is difficult for the movie producer or TV producer to create more diversified approaches for presenting video in view of the limited number of screen in the existing video playback system, and it is thus difficult for the movie industry to provide the audiences with more rich and more different experience in watching videos.

Conventional movie post-production software, however, can only support an editor to edit contents to be playbacked in a single screen, and is not capable of supporting the editor to simultaneously edit contents to be playbacked in multiple screens. Accordingly, the editor is not allowed to configure playback timing correlation of contents to be playbacked in different screens through the conventional movie post-production software. As a result, there is a significant bottleneck in producing contents for use in multi-screen playback applications, and the development of the multi-screen playback applications is thus severely restricted.

SUMMARY

An example embodiment of a playback timing correlation editing method for controlling a timing correlation establishing device to establish playback timing correlation between contents to be playbacked by different playback devices is disclosed. The timing correlation establishing device comprises a display device, an input device, a communication circuit, and a control circuit. The method comprises utilizing the display device to display an editing screen containing a timeline; displaying a main device block corresponding to a main display device in the editing screen; when an editor requests to add a main video clip corresponding to the main display device through the input device, displaying a main event block corresponding to the main video clip in the main device block, and displaying a main event name corresponding to the main video clip and a main event graph representing a total time length of the main video clip in the main event block; when the editor requests to add a device block though the input device, displaying a first auxiliary device block corresponding to a first auxiliary display device in the editing screen; when the editor requests to add a first auxiliary video clip corresponding to the first auxiliary display device through the input device, displaying a first auxiliary event block corresponding to the first auxiliary video clip in the first auxiliary device block, and displaying a first auxiliary event name corresponding to the first auxiliary video clip and a first auxiliary event graph representing a total time length of the first auxiliary video clip in the first auxiliary event block; displaying a time marker on a position of a first time point on the timeline according to the editor's manipulation to the input device; when the editor selects the main event name or the main event graph through the input device, configuring the main event block to have a highlighted pattern; and when the time marker is located at the position of the first time point on the timeline, if the editor conducts a first set of predetermined manipulations through the input device, configuring the main video clip as a first trigger source event, configuring the first auxiliary video clip as a first trigger target event, and utilizing the control circuit to establish a first trigger timing data for indicating that the first auxiliary display device has to begin playbacking the first auxiliary video clip when the main display device playbacks the main video clip to the first time point.

Another example embodiment of a computer program product, stored in a non-transitory storage device, for controlling a timing correlation establishing device to establish playback timing correlation between contents to be playbacked by different playback devices is disclosed. The timing correlation establishing device comprises a display device, an input device, a communication circuit, and a control circuit. The computer program product comprises: an editing screen generating module for utilizing the display device to display an editing screen containing a timeline; a device block control module for displaying a main device block corresponding to a main display device in the editing screen; an event editing module, wherein when an editor requests to add a main video clip corresponding to the main display device through the input device, the event editing module displays a main event block corresponding to the main video clip in the main device block, and displays a main event name corresponding to the main video clip and a main event graph representing a total time length of the main video clip in the main event block; a time marker control module; and a timing correlation setting module; wherein when the editor requests to add a device block though the input device, the device block control module displays a first auxiliary device block corresponding to a first auxiliary display device in the editing screen; wherein when the editor requests to add a first auxiliary video clip corresponding to the first auxiliary display device through the input device, the event editing module displays a first auxiliary event block corresponding to the first auxiliary video clip in the first auxiliary device block, and displays a first auxiliary event name corresponding to the first auxiliary video clip and a first auxiliary event graph representing a total time length of the first auxiliary video clip in the first auxiliary event block; wherein the time marker control module displays a time marker on a position of a first time point on the timeline according to the editor's manipulation to the input device;

wherein when the editor selects the main event name or the main event graph through the input device, the event editing module configures the main event block to have a highlighted pattern; wherein when the time marker is located at the position of the first time point on the timeline, if the editor conducts a first set of predetermined manipulations through the input device, the timing correlation setting module configures the main video clip as a first trigger source event, configures the first auxiliary video clip as a first trigger target event, and utilizes the control circuit to establish a first trigger timing data for indicating that the first auxiliary display device has to begin playbacking the first auxiliary video clip when the main display device playbacks the main video clip to the first time point.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
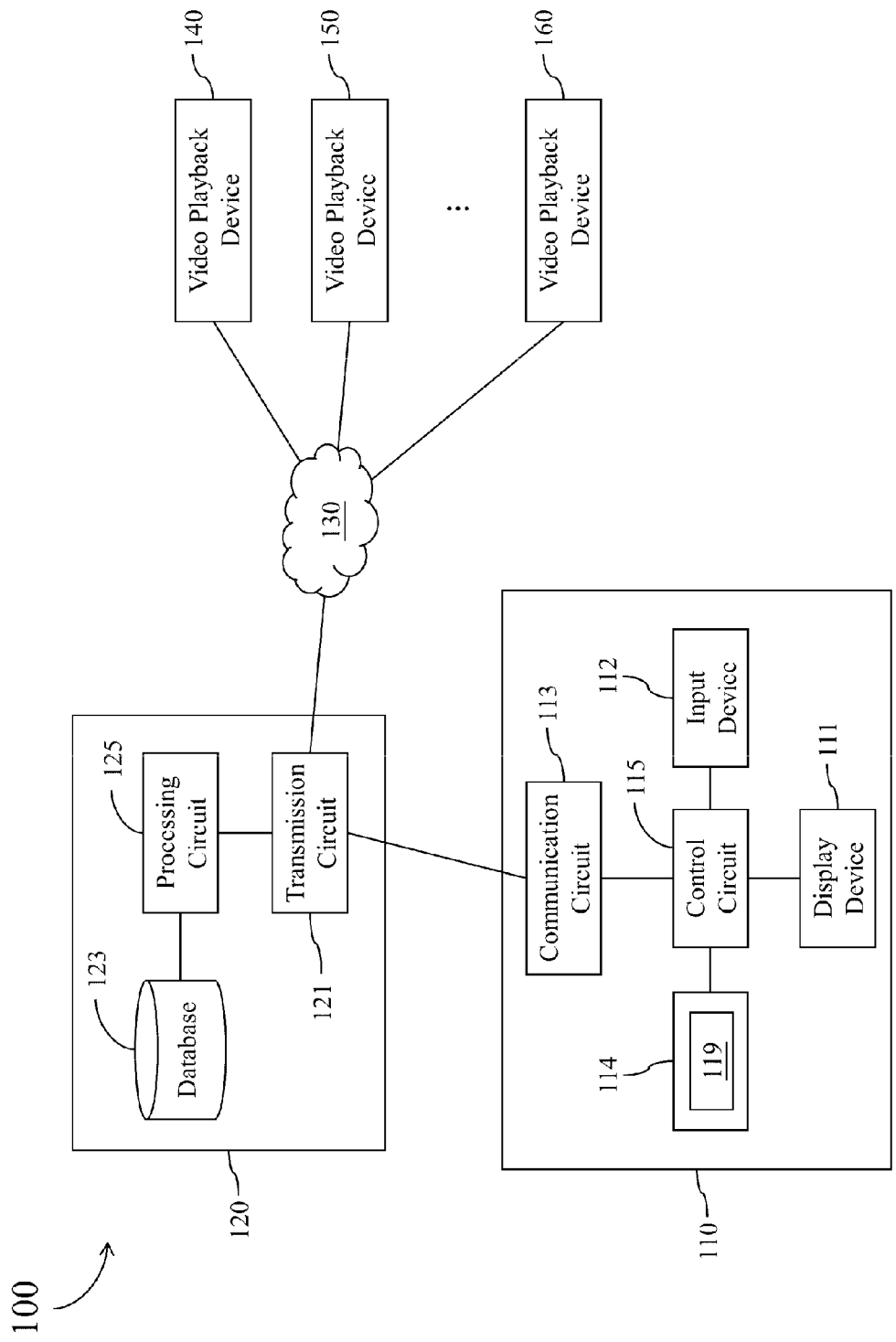
FIG. 1 shows a simplified functional block diagram of a multi-screen multimedia playback system according to one embodiment of the present disclosure.

FIG. 1 shows a simplified functional block diagram of a multi-screen multimedia playback system 100 according to one embodiment of the present disclosure. The multi-screen multimedia playback system 100 comprises a timing correlation establishing device 110, a multi-screen playback controlling server 120, and multiple video playback devices (only video playback devices 140~160 are shown in FIG. 1 as examples). In the embodiment of FIG. 1, the timing correlation establishing device 110 comprises a display device 111, an input device 112, a communication circuit 113, a storage device 114, and a control circuit 115, and the multi-screen playback controlling server 120 comprises a transmission circuit 121, a database 123, and a processing circuit 125.

In the timing correlation establishing device 110, the display device 111 is configured to operably display images. The input device 112 is configured to operably receive various editing commands inputted from the editor. The communication circuit 113 is configured to operably communicate data with the multi-screen playback controlling server 120. The storage device 114 is configured operably store a playback timing correlation editing program 119 and other data required for the operations of the timing correlation establishing device 110, wherein the playback timing correlation editing program 119 is utilized for controlling the timing correlation establishing device 110 to generate trigger timing data of contents to be playbacked by different playback devices. The control circuit 115 is coupled with the display device 111, the input device 112, the communication circuit 113, and the storage device 114, and is configured to operably control operations of the display device 111, the input device 112, the communication circuit 113, and the storage device 114.

In the multi-screen playback controlling server 120, the transmission circuit 121 is configured to operably receive data transmitted from the timing correlation establishing device 110. The database 123 is configured to operably store data received by the transmission circuit 121. The processing circuit 125 is coupled with the transmission circuit 121 and the database 123, and configured to operably control operations of the transmission circuit 121 and the database 123. In operations, the processing circuit 125 controls the transmission circuit 121 to communicate data with the video playback devices 140~160 via the internet 130.

Each of the aforementioned communication circuit 113 and transmission circuit 121 may be realized with a wired network interface, a wireless network interface, or a hybrid circuit integrated with the above two interfaces. Each of the aforementioned control circuit 115 and processing circuit 125 may be realized with one or more processor units. The aforementioned input device 112 may be realized with a touch screen, a touch pad, a keyboard, a computer mouse, a voice control device, a posture sensing device, other command generating circuit, or a combination of the aforementioned devices. Furthermore, the display device 111 may be realized with any display screen or projector, and may be integrated with the input device 112 into a touch screen.

In practice, the multi-screen playback controlling server 120 may be realized with a single server, or may be realized with a combination of multiple servers located in the same geographical area or located in different geographical areas. Each of the video playback devices 140~160 may be realized with any device capable of connecting to the internet and capable of displaying images, such as a computer (e.g., a tablet computer, a notebook computer, or a netbook computer), a TV, an electronic book, a hand-held game console, or a home theater system. For convenience of illustration, other elements in the multi-screen playback controlling server 120 and the video playback devices 140~160 and their connection relationship are not shown in FIG. 1.

Figure 2:
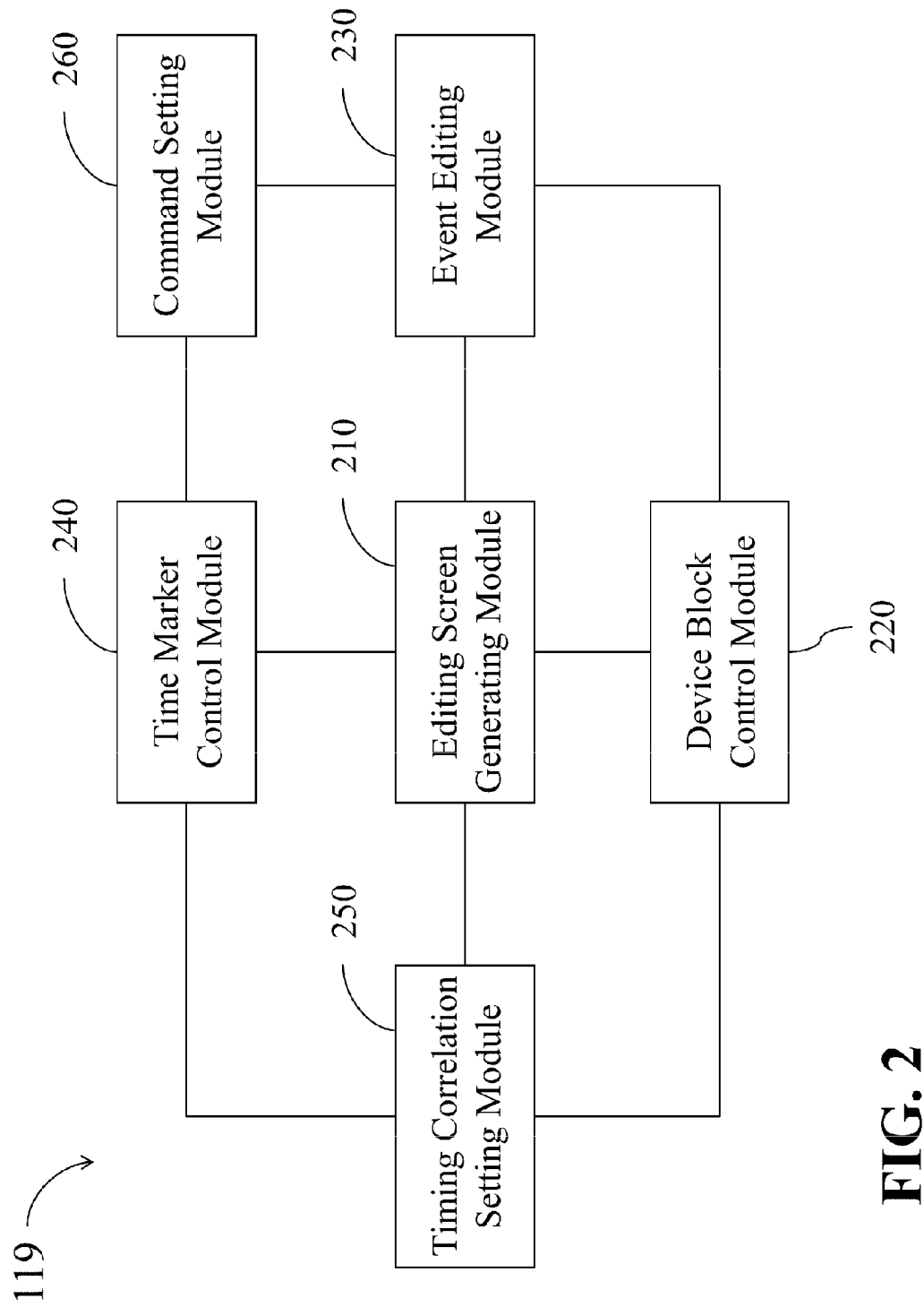
FIG. 2 shows a simplified schematic diagram of functional modules of a playback timing correlation editing program of a timing correlation establishing device in FIG. 1 according to one embodiment of the present disclosure.

The playback timing correlation editing program 119 in the aforementioned timing correlation establishing device 110 may be realized with a computer program product formed by one or more functional modules. For example, FIG. 2 shows a simplified schematic diagram of functional modules of the playback timing correlation editing program 119 in FIG. 1 according to one embodiment of the present disclosure. In this embodiment, the playback timing correlation editing program 119 comprises an editing screen generating module 210, a device block control module 220, an event editing module 230, a time marker control module 240, a timing correlation setting module 250, and a command setting module 260.

Figure 3:
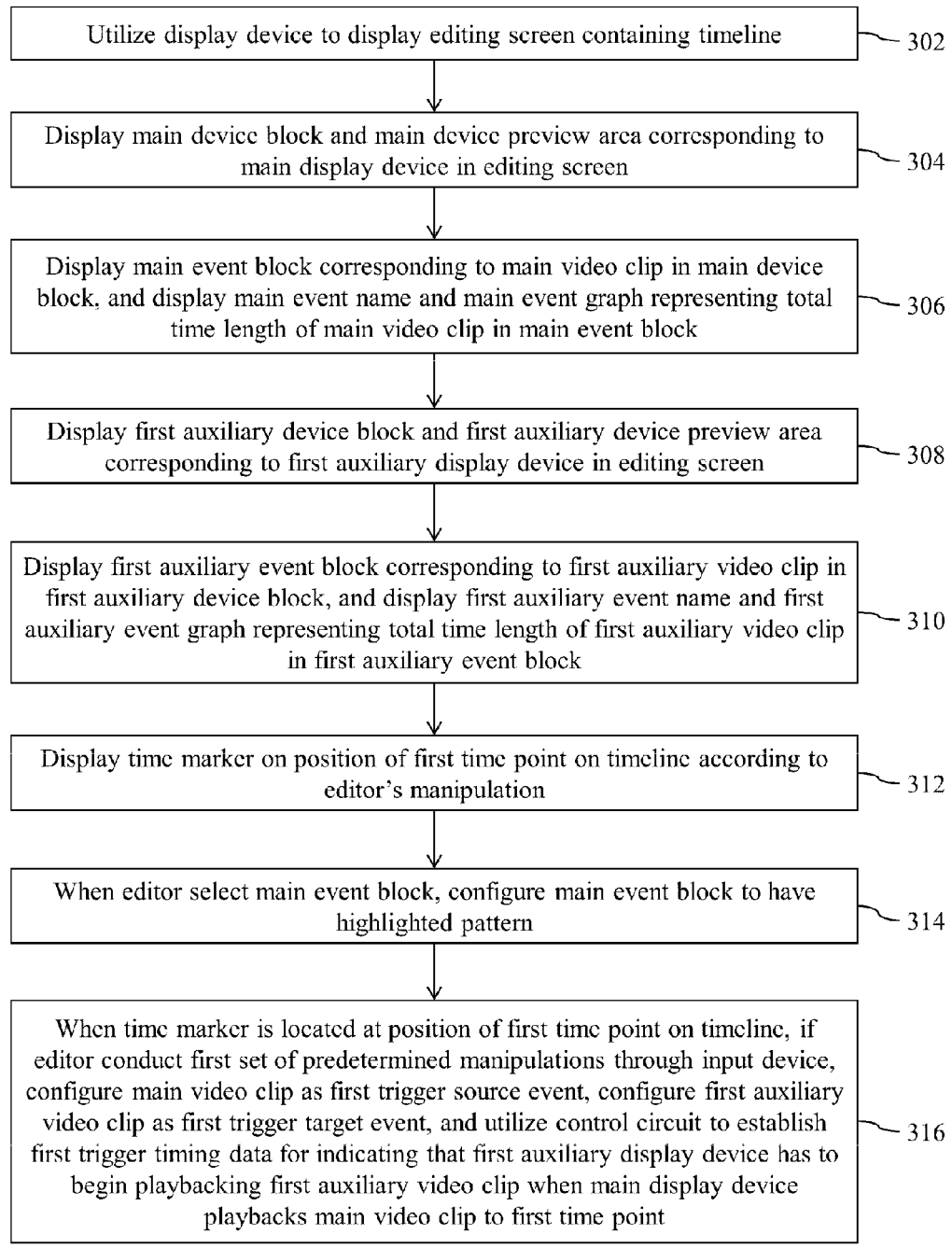
FIG. 3 shows a simplified flowchart of a playback timing correlation editing method according to one embodiment of the present disclosure.

The operations of the multi-screen multimedia playback system 100 will be further described in the following by reference to FIG. 3 through FIG. 13. FIG. 3 shows a simplified flowchart of a playback timing correlation editing method according to one embodiment of the present disclosure. FIGS. 4~13 show simplified schematic diagrams of an editing screen 400 generated by the playback timing correlation editing program 119 in different stages according to one embodiment of the present disclosure.

Figure 4:
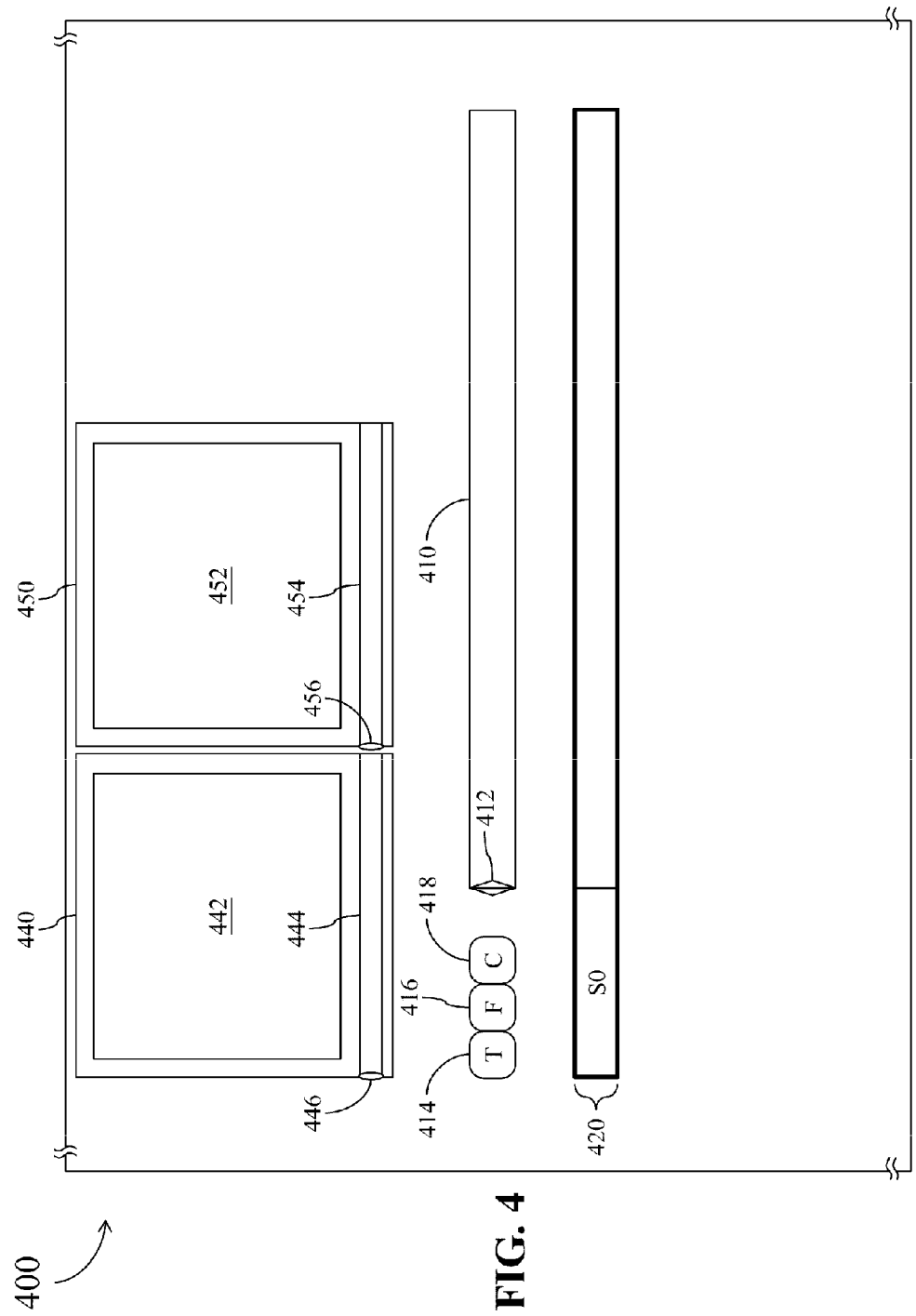
FIGS. 4-13 show simplified schematic diagrams of an editing screen generated by the playback timing correlation editing program in FIG. 1 in different stages according to one embodiment of the present disclosure.

When an editor want to utilize the timing correlation establishing device 110 to establish trigger timing data of contents to be playbacked by different playback devices, the editing screen generating module 210 of the playback timing correlation editing program 119 performs operation 302 to utilize the display device 111 to generate an editing screen 400 as illustrated in FIG. 4. In this embodiment, the editing screen 400 comprises a timeline 410, a time marker 412, a to-event setting button 414, a from-event setting button 416, a command setting button 418, and an event preview area 440. The event preview area 440 comprises a displaying area 442 for displaying a selected event, and a progress bar 444 and a progress indicator 446 corresponding to the displaying area 442.

In operation 304, the device block control module 220 displays a main device block corresponding to a main display device 420 and a main device preview area 450 in the editing screen 400. The main device preview area 450 comprises a displaying area 452 for displaying contents to be playbacked by the main display device, and a progress bar 454 and a progress indicator 456 corresponding to the displaying area 452.

Figure 5:
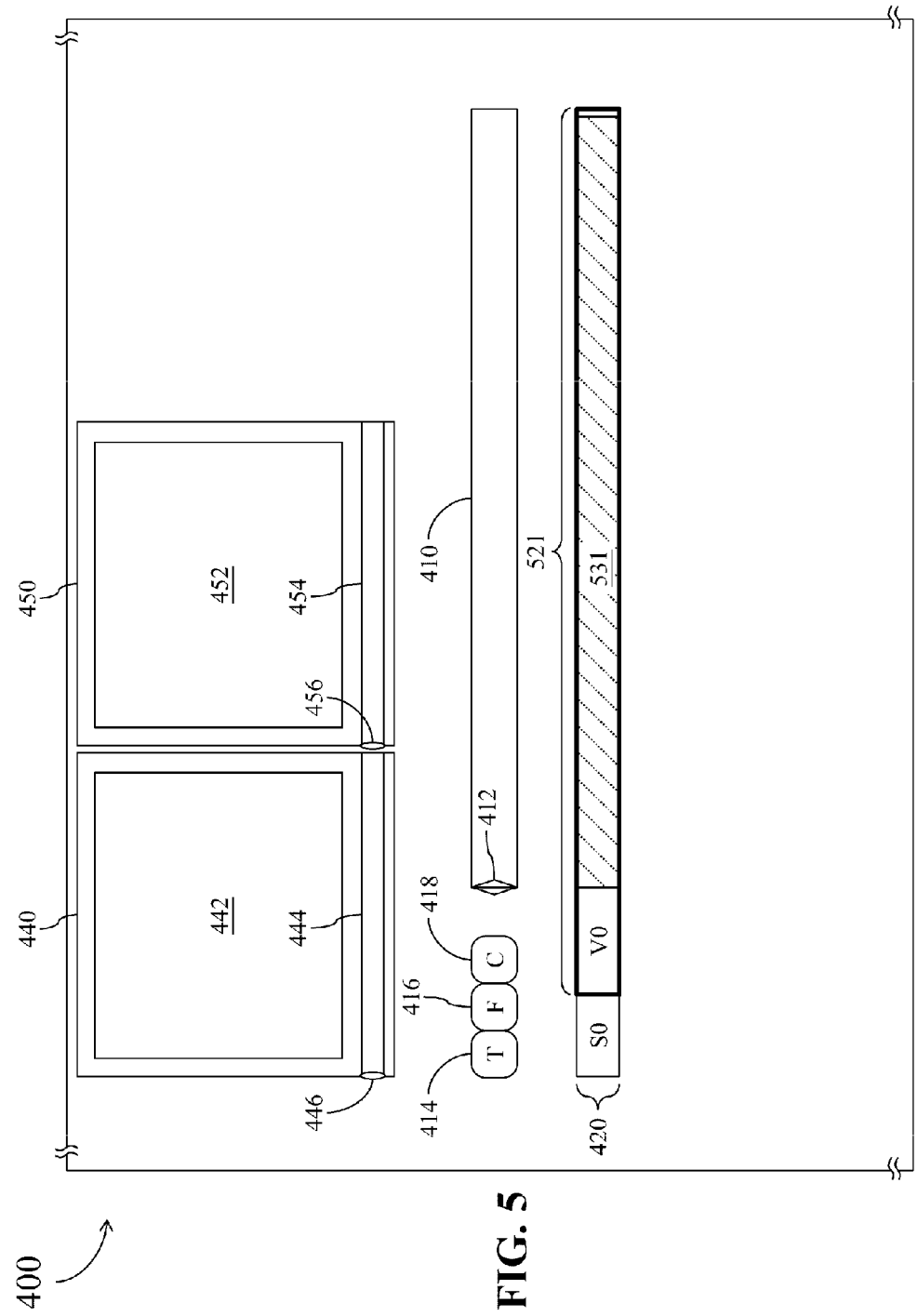

As shown in FIG. 5, when the editor requests to add a main video clip corresponding to the main display device through the input device 112, the event editing module 230 performs operation 306 to display a main event block 521 corresponding to the main video clip in the main device block 420 and to display a main event name V0 corresponding to the main video clip and a main event graph 531 representing a total time length of the main video clip in the main event block 521. The editor is allowed to preview the contents of the main video clip from the main device preview area 450.

Figure 6:
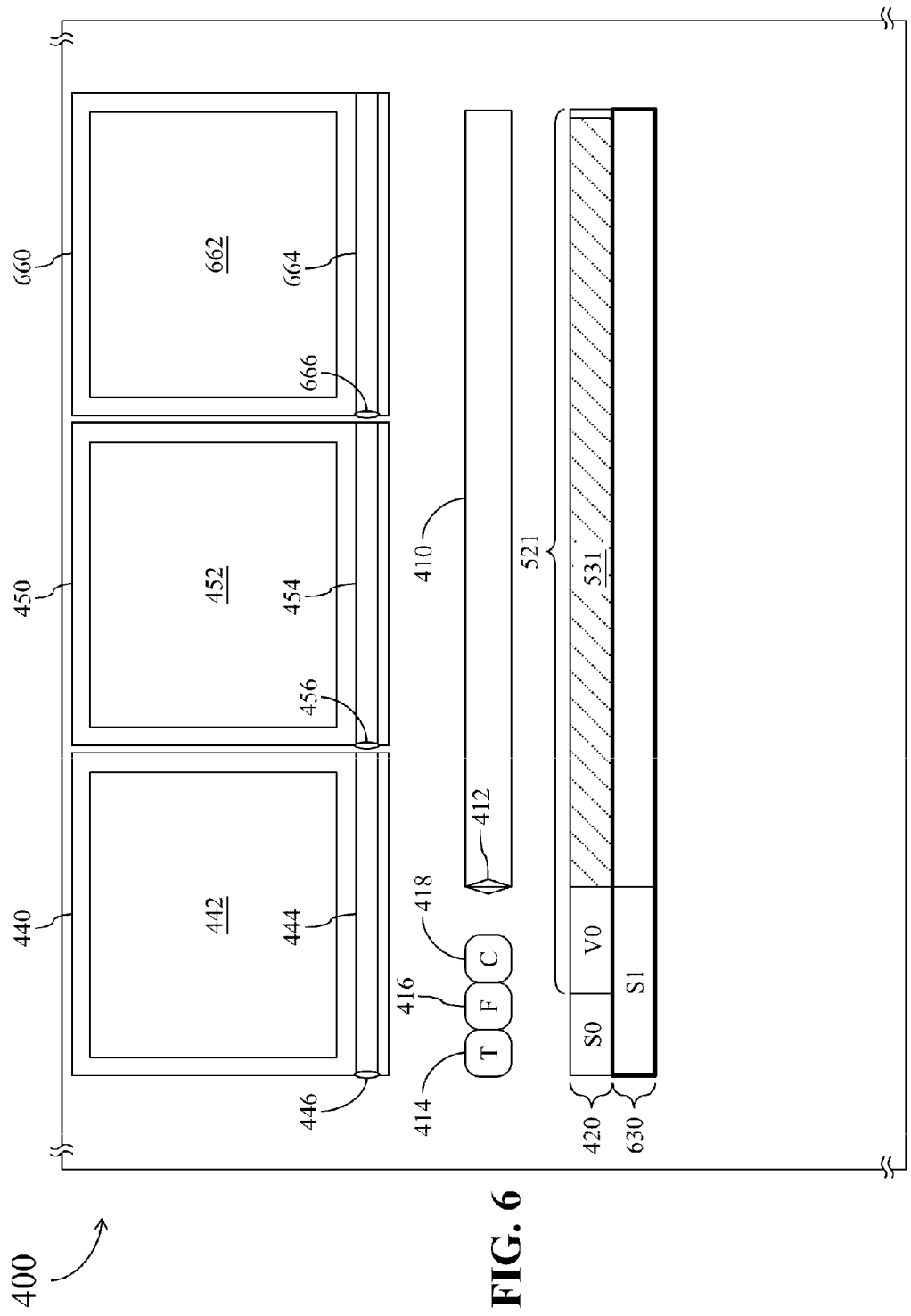

As shown in FIG. 6, when the editor requests to add a device block through the input device 112, the device block control module 220 performs operation 308 to display a first auxiliary device block 630 and a first auxiliary device preview area 660 corresponding to a first auxiliary display device in the editing screen 400. The first auxiliary device preview area 660 comprises a displaying area 662 for displaying contents to be playbacked by the first auxiliary display device, and a progress bar 664 and a progress indicator 666 corresponding to the displaying area 662.

Figure 7:
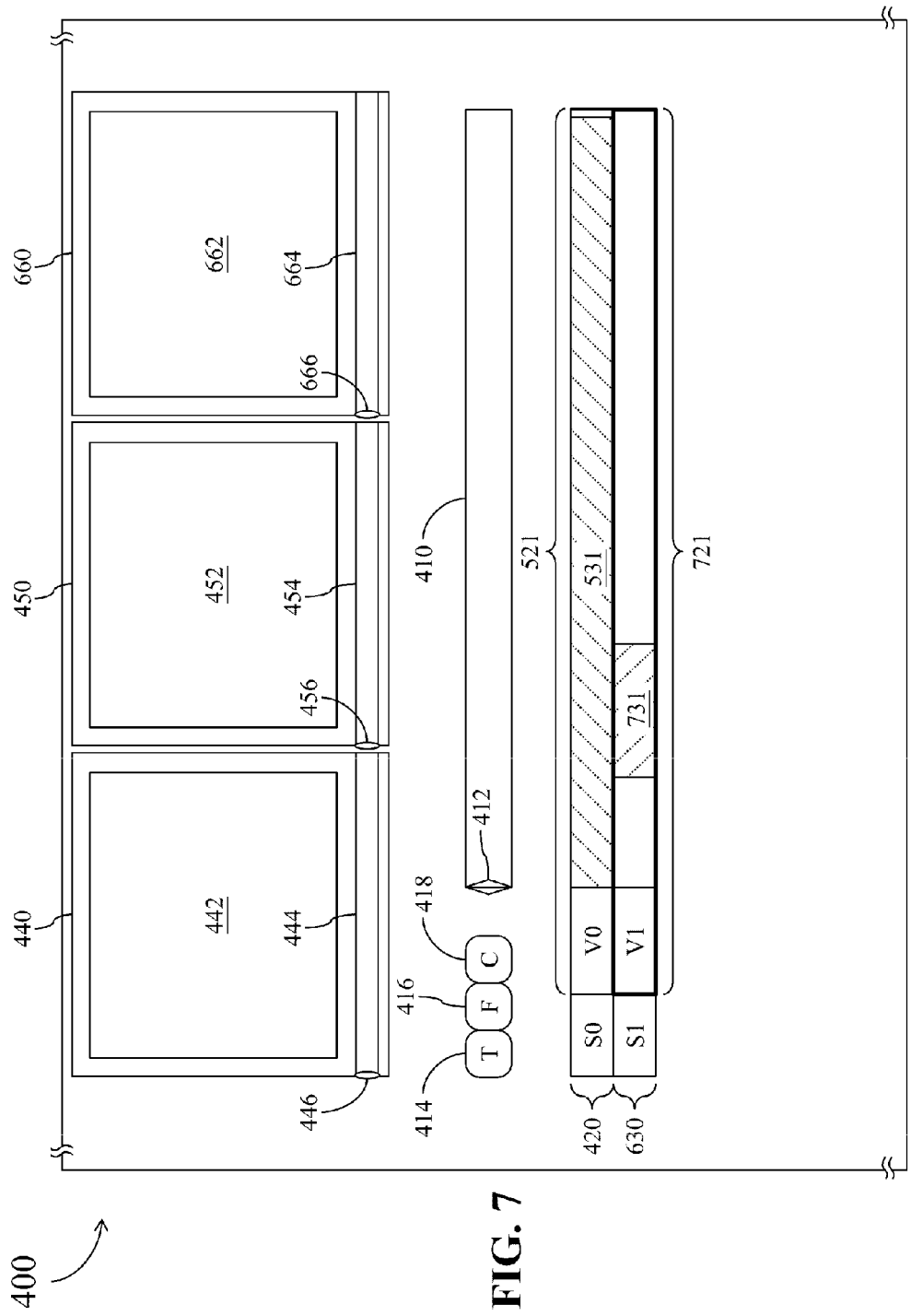

As shown in FIG. 7, when the editor requests to add a first auxiliary video clip corresponding to the first auxiliary display device through the input device 112, the event editing module 230 performs operation 310 to display a first auxiliary event block 721 corresponding to the first auxiliary video clip in the first auxiliary device block 630 and to display a first auxiliary event name V1 corresponding to the first auxiliary video clip and a first auxiliary event graph 731 representing a total time length of the first auxiliary video clip in the first auxiliary event block 721.

In this embodiment, the editor may configure a playback timing correlation among related events with respect to a specific time point by moving the time marker 412 on the timeline 410, clicking corresponding objects of the related events, and conducting a set of predetermined manipulations to the input device 112.

For example, the editor may manipulate the input device 112 to instruct the playback timing correlation editing program 119 to move the time marker 412 on the timeline 410 to the position of a first time point T1. At this moment, as illustrated in FIG. 8, the time marker control module 240 performs operation 312 to display the time marker 412 on the position of the first time point T1 on the timeline 410 according to the editor's manipulations to the input device 112.

During the editing operations, the editor may manipulate the input device 112 to select one or more specific events in the editing screen 400 to conduct subsequent timing correlation editing operations, or to preview contents of the specific event.

Figure 8:
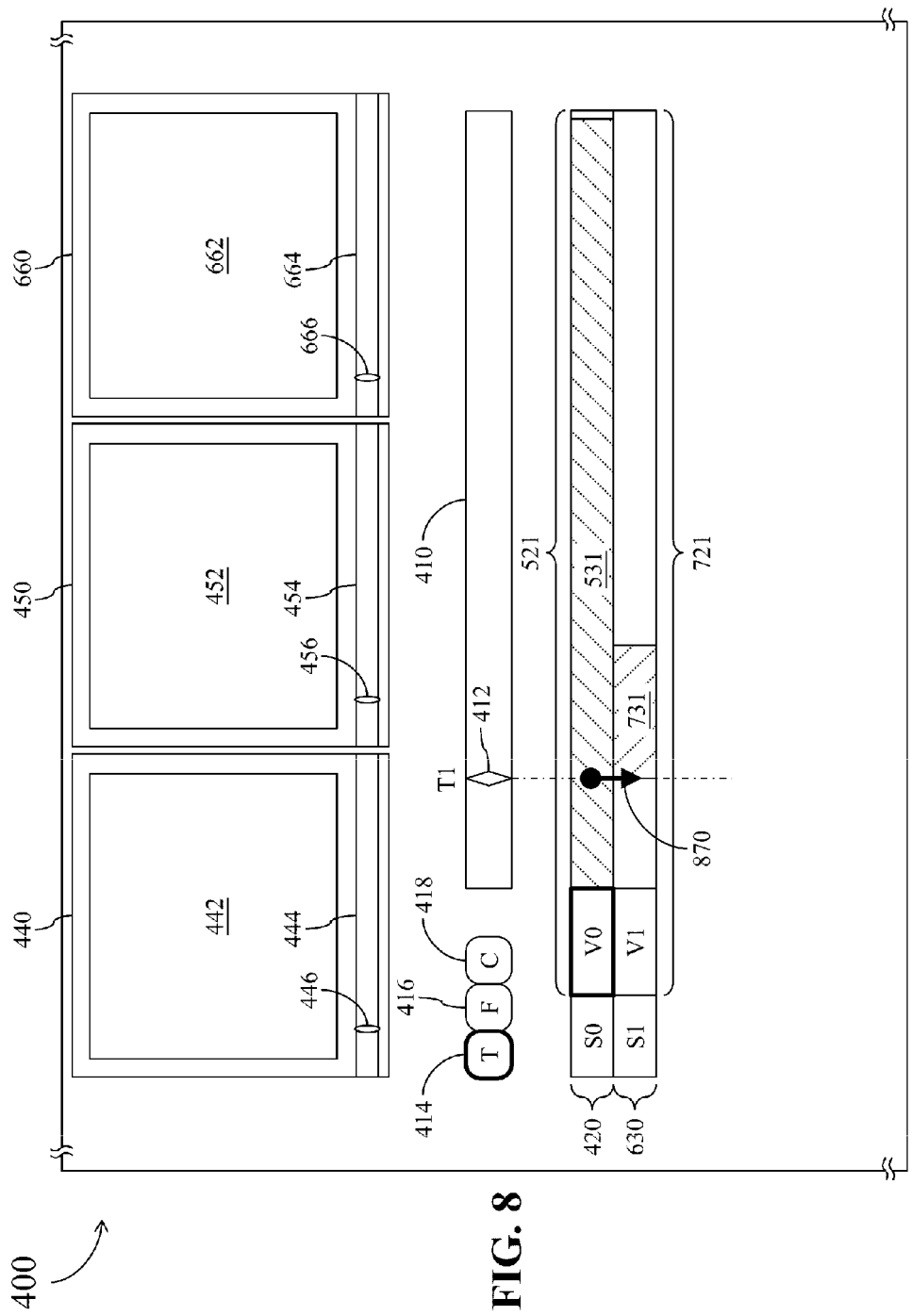

For example, in the embodiment of FIG. 8, when the editor selects the main event block 521 through the input device 112, the event editing module 230 performs operation 314 to configure the main event block 521 to have a highlighted pattern. In practice, the editor may select the main event block 521 by clicking the main event name V0, by clicking the main event graph 531, or by clocking the frame of the main event block 521. In addition, the operation of configuring the main event block 521 to have the highlighted pattern performed by the event editing module 230 refers to making the main event block 521 to have a highlighted visual presentation by various approaches, such as by changing the thickness of the frame of the main event block 521, by changing the frame color of the main event block 521, by changing the fill color of the main event block 521, by changing the font size of the main event name V0, by changing the color of the main event name V0, by changing the thickness of the frame of the displaying area of the main event name V0, by changing the frame color of the displaying area of the main event name V0, or by changing the fill color of the displaying area of the main event name V0, so that the editor is enabled to be clearly aware of that the main video clip is the currently selected event.

When the time marker 412 is located at the position of the first time point T1 on the timeline 410, if the editor conducts a first set of predetermined manipulations through the input device 112, the timing correlation setting module 250 performs operation 316 to configure the main video clip as a first trigger source event, to configure the first auxiliary video clip as a first trigger target event, and to utilize the control circuit 115 to establish a first trigger timing data for indicating that the first auxiliary display device has to begin playbacking the first auxiliary video clip when the main display device playbacks the main video clip to the first time point T1.

In one embodiment, for example, when the time marker 412 is located at the position of the first time point T1 on the timeline 410, if the editor firstly selects the main event block 521 through the input device 112, then clicks the to-event setting button 414, and then clicks the first auxiliary event block 721, the timing correlation setting module 250 configures the main video clip as the first trigger source event, configures the first auxiliary video clip as the first trigger target event, and utilizes the control circuit 115 to establish the aforementioned first trigger timing data.

In another embodiment, when the time marker 412 is located at the position of the first time point T1 on the timeline 410, if the editor firstly selects the main event block 521 through the input device 112, then triggers the timing correlation setting module 250 to display a first menu (not shown) containing a trigger target setting option in the editing screen 400, and then selects the trigger target setting option from the first menu, and then clicks the first auxiliary event block 721, the timing correlation setting module 250 configures the main video clip as the first trigger source event, and configures the first auxiliary video clip as the first trigger target event.

In another embodiment, when the time marker 412 is located at the position of the first time point T1 on the timeline 410, if the editor firstly selects the main event block 521 through the input device 112, then presses a first set of predetermined hotkeys (e.g., a key combination having equivalent function as the aforementioned to-event setting button 414) on the input device 112, and then clicks the first auxiliary event block 721, the timing correlation setting module 250 configures the main video clip as the first trigger source event, and configures the first auxiliary video clip as the first trigger target event.

Alternatively, when the time marker 412 is located at the position of the first time point T1 on the timeline 410, if the editor conducts a first set of manipulations related to the main event block 521 through the input device 112, the timing correlation setting module 250 configures the main video clip as the first trigger source event. Similarly, if the editor conducts a second set of manipulations related to the first auxiliary event block 721 through the input device 112, the timing correlation setting module 250 configures the first auxiliary video clip as the first trigger target event. Please note that the execution order of the aforementioned first set of manipulations can be swapped with the second set of manipulations. That is, the aforementioned first set of manipulations can be conducted before or after the second set of manipulations.

In one embodiment, for example, the aforementioned first set of manipulations comprise selecting the main event block 521 and then clicking the from-event setting button 416, and the aforementioned second set of manipulations comprise selecting the first auxiliary event block 721 and then clicking the to-event setting button 414.

In another embodiment, the aforementioned first set of manipulations comprise selecting the main event block 521, then triggering the timing correlation setting module 250 to display a second menu (not shown) containing a trigger source setting option in the editing screen 400, and then selecting the trigger source setting option from the second menu. The aforementioned second set of manipulations comprise selecting the first auxiliary event block 721, then triggering the timing correlation setting module 250 to display the aforementioned first menu (not shown) containing the trigger target setting option in the editing screen 400, and then selecting the trigger target setting option from the first menu. In practice, the editor may trigger the timing correlation setting module 250 to utilize the display device 111 to display the aforementioned first menu or the second menu in the editing screen 400 by clicking a predetermined button (e.g., a right button) on the input device 112, by long-clicking a specific portion on the input device 112, or by forming a set of specific finger print traces on the input device 112.

In another embodiment, the aforementioned first set of manipulations comprise selecting the main event block 521 and then pressing a second set of predetermined hotkeys (e.g., a key combination having equivalent function as the aforementioned from-event setting button 416) on the input device 112, and the aforementioned second set of manipulations comprise selecting the first auxiliary event block 721 and then pressing the aforementioned first set of predetermined hotkeys on the input device 112.

In another embodiment, the aforementioned first set of manipulations comprise selecting the main event block 521 and then forming a first set of finger print traces (e.g., a set of traces having equivalent function as pressing the aforementioned from-event setting button 416) on the input device 112, and the aforementioned second set of manipulations comprise selecting the first auxiliary event block 721 and then forming a second set of finger print traces (e.g., a set of traces having equivalent function as pressing the aforementioned to-event setting button 414) on the input device 112.

As shown in FIG. 8, the timing correlation setting module 250 may place a first trigger indicator 870 corresponding to the position of the first time point T1 between the main event block 521 and the first auxiliary event block 721, so that the editor is enabled to be aware of relevant events and triggering direction corresponding to the aforementioned first trigger timing data from the editing screen 400 in a very straightforward approach, thereby increasing the correctness and efficiency in editing the playback timing correlation.

Figure 9:
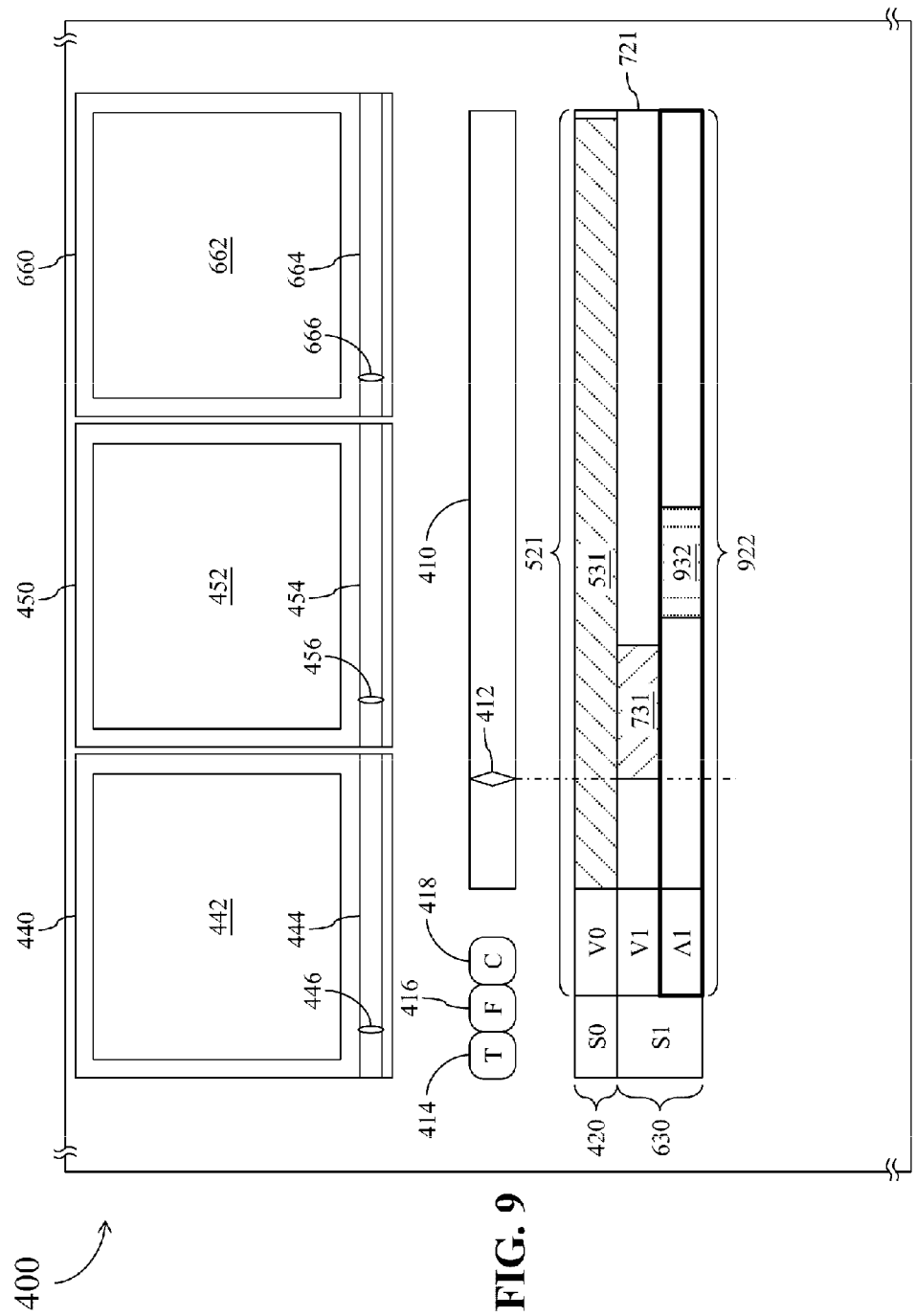

Afterward, as shown in FIG. 9, when the editor requests to add a first auxiliary audio clip corresponding to the first auxiliary display device through the input device 112, the event editing module 230 displays a second auxiliary event block 922 corresponding to the first auxiliary audio clip in the first auxiliary device block 630, and displays a second auxiliary event name A1 corresponding to the first auxiliary audio clip and a second auxiliary event graph 932 representing a total time length of the first auxiliary audio clip in the second auxiliary event block 922.

Figure 10:
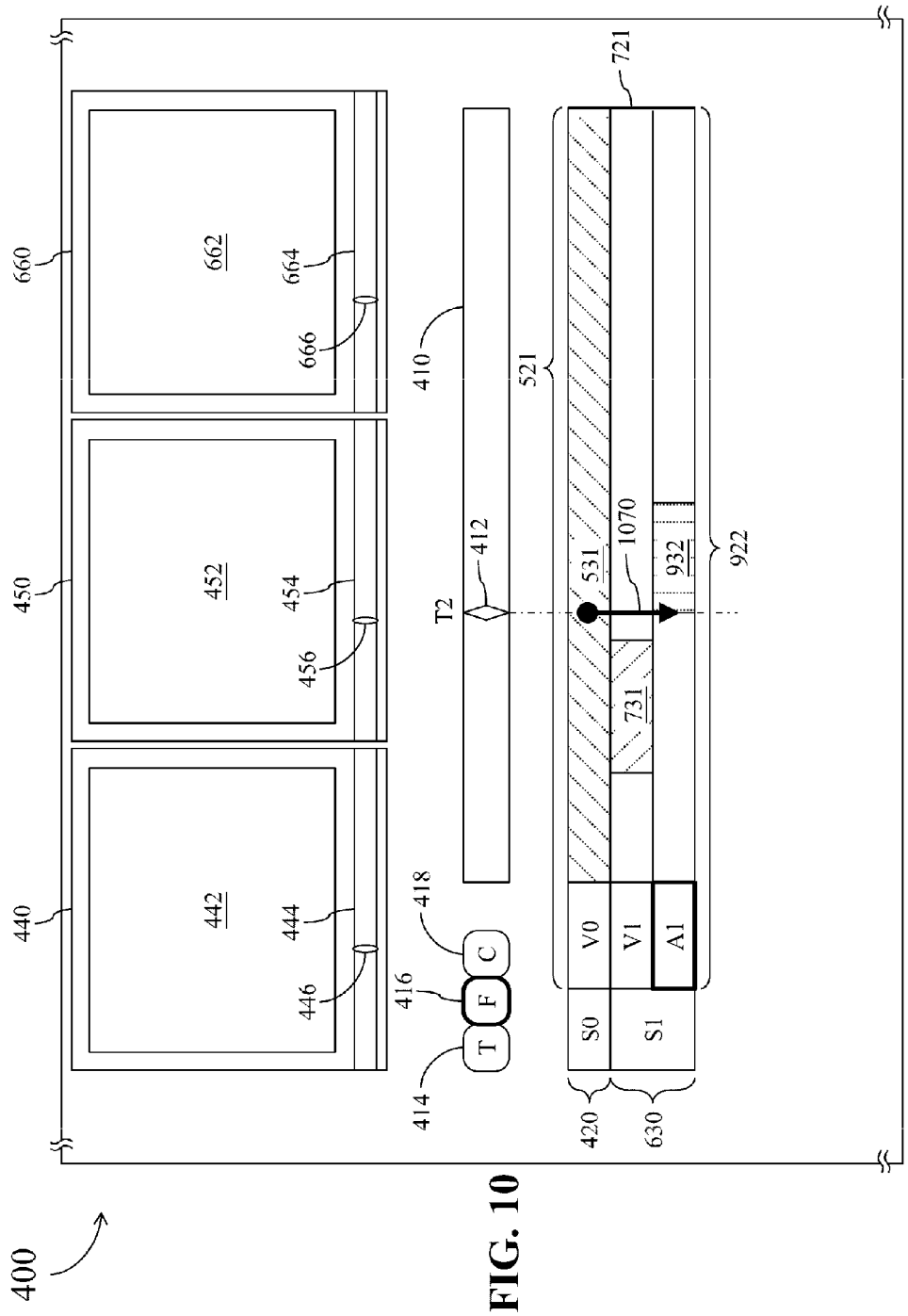

In the embodiment of FIG. 10, when the editor selects the second auxiliary event block 922 through the input device 112, the event editing module 230 configures the second auxiliary event block 922 to have a highlighted pattern. In practice, the editor may select the second auxiliary event block 922 by clicking the second auxiliary event name A1, by clicking the second auxiliary event graph 932, or by clicking the frame of the second auxiliary event block 922. Similarly, the operation of configuring the second auxiliary event block 922 to have the highlighted pattern performed by the event editing module 230 refers to making the second auxiliary event block 922 to have a highlighted visual presentation by various approaches, such as by changing the thickness of the frame of the second auxiliary event block 922, by changing the frame color of the second auxiliary event block 922, by changing the fill color of the second auxiliary event block 922, by changing the font size of the main event name A1, by changing the color of the main event name A1, by changing the thickness of the frame of the displaying area of the main event name A1, by changing the frame color of the displaying area of the main event name A1, or by changing the fill color of the displaying area of the main event name A1, so that the editor is enabled to be clearly aware of that the first auxiliary audio clip is the currently selected event.

The editor may utilize the playback timing correlation editing program 119 to establish the playback timing correlation between the main video clip and the first auxiliary audio clip with respect to a specific time point by using previous approaches.

For example, the editor may manipulate the input device 112 to instruct the playback timing correlation editing program 119 to move the time marker 412 on the timeline 410 to the position of a second time point T2. At this moment, as illustrated in FIG. 10, the time marker control module 240 moves the time marker 412 to the position of the second time point T2 on the timeline 410 according to the editor's manipulations to the input device 112.

When the time marker 412 is located at the position of the second time point T2 on the timeline 410, if the editor conducts a second set of predetermined manipulations through the input device 112, the timing correlation setting module 250 performs operation similar to the previous operation 316 to configure the main video clip as a second trigger source event, to configure the first auxiliary audio clip as a second trigger target event, and to utilize the control circuit 115 to establish a second trigger timing data for indicating that the first auxiliary display device has to begin playbacking the first auxiliary audio clip when the main display device playbacks the main video clip to the second time point T2.

In one embodiment, for example, when the time marker 412 is located at the position of the second time point T2 on the timeline 410, if the editor firstly selects the main event block 521 through the input device 112, then clicks the to-event setting button 414, and then clicks the second auxiliary event block 922, the timing correlation setting module 250 configures the main video clip as the second trigger source event, configures the first auxiliary audio clip as the second trigger target event, and utilizes the control circuit 115 to establish the aforementioned second trigger timing data.

In another embodiment, when the time marker 412 is located at the position of the second time point T2 on the timeline 410, if the editor firstly selects the main event block 521 through the input device 112, then triggers the timing correlation setting module 250 to display the aforementioned first menu (not shown) containing the trigger target setting option in the editing screen 400, and then selects the trigger target setting option from the first menu, and then clicks the second auxiliary event block 922, the timing correlation setting module 250 configures the main video clip as the second trigger source event, and configures the first auxiliary audio clip as the second trigger target event.

In another embodiment, when the time marker 412 is located at the position of the second time point T2 on the timeline 410, if the editor firstly selects the main event block 521 through the input device 112, then presses the aforementioned first set of predetermined hotkeys on the input device 112, and then clicks the second auxiliary event block 922, the timing correlation setting module 250 configures the main video clip as the second trigger source event, and configures the first auxiliary audio clip as the second trigger target event.

Alternatively, when the time marker 412 is located at the position of the second time point T2 on the timeline 410, if the editor conducts the aforementioned first set of manipulations related to the main event block 521 through the input device 112, the timing correlation setting module 250 configures the main video clip as the second trigger source event. Similarly, if the editor conducts a third set of manipulations related to the second auxiliary event block 922 through the input device 112, the timing correlation setting module 250 configures the first auxiliary audio clip as the second trigger target event. Please note that the execution order of the aforementioned first set of manipulations can be swapped with the third set of manipulations. That is, the aforementioned first set of manipulations can be conducted before or after the third set of manipulations.

In one embodiment, for example, the aforementioned first set of manipulations comprise selecting the main event block 521 and then clicking the from-event setting button 416, and the aforementioned third set of manipulations comprise selecting the second auxiliary event block 922 and then clicking the to-event setting button 414.

In another embodiment, the aforementioned first set of manipulations comprise selecting the main event block 521, then triggering the timing correlation setting module 250 to display the aforementioned second menu (not shown) containing the trigger source setting option in the editing screen 400, and then selecting the trigger source setting option from the second menu. The aforementioned third set of manipulations comprise selecting the second auxiliary event block 922, then triggering the timing correlation setting module 250 to display the aforementioned first menu (not shown) containing the trigger target setting option in the editing screen 400, and then selecting the trigger target setting option from the first menu.

In another embodiment, the aforementioned first set of manipulations comprise selecting the main event block 521 and then pressing the aforementioned second set of predetermined hotkeys on the input device 112, and the aforementioned third set of manipulations comprise selecting the second auxiliary event block 922 and then pressing the aforementioned first set of predetermined hotkeys on the input device 112.

In another embodiment, the aforementioned first set of manipulations comprise selecting the main event block 521 and then forming the aforementioned first set of finger print traces on the input device 112, and the aforementioned third set of manipulations comprise selecting the second auxiliary event block 922 and then forming the aforementioned second set of finger print traces on the input device 112.

As shown in FIG. 10, the timing correlation setting module 250 may place a second trigger indicator 1070 corresponding to the position of the second time point T2 between the main event block 521 and the second auxiliary event block 922, so that the editor is enabled to be aware of relevant events and triggering direction corresponding to the aforementioned second trigger timing data from the editing screen 400 in a very straightforward approach, thereby increasing the correctness and efficiency in editing the playback timing correlation.

In practical applications, the auxiliary events can be edited by the editor on the editing screen 400 are not restricted to video clips and audio clips.

Figure 11:
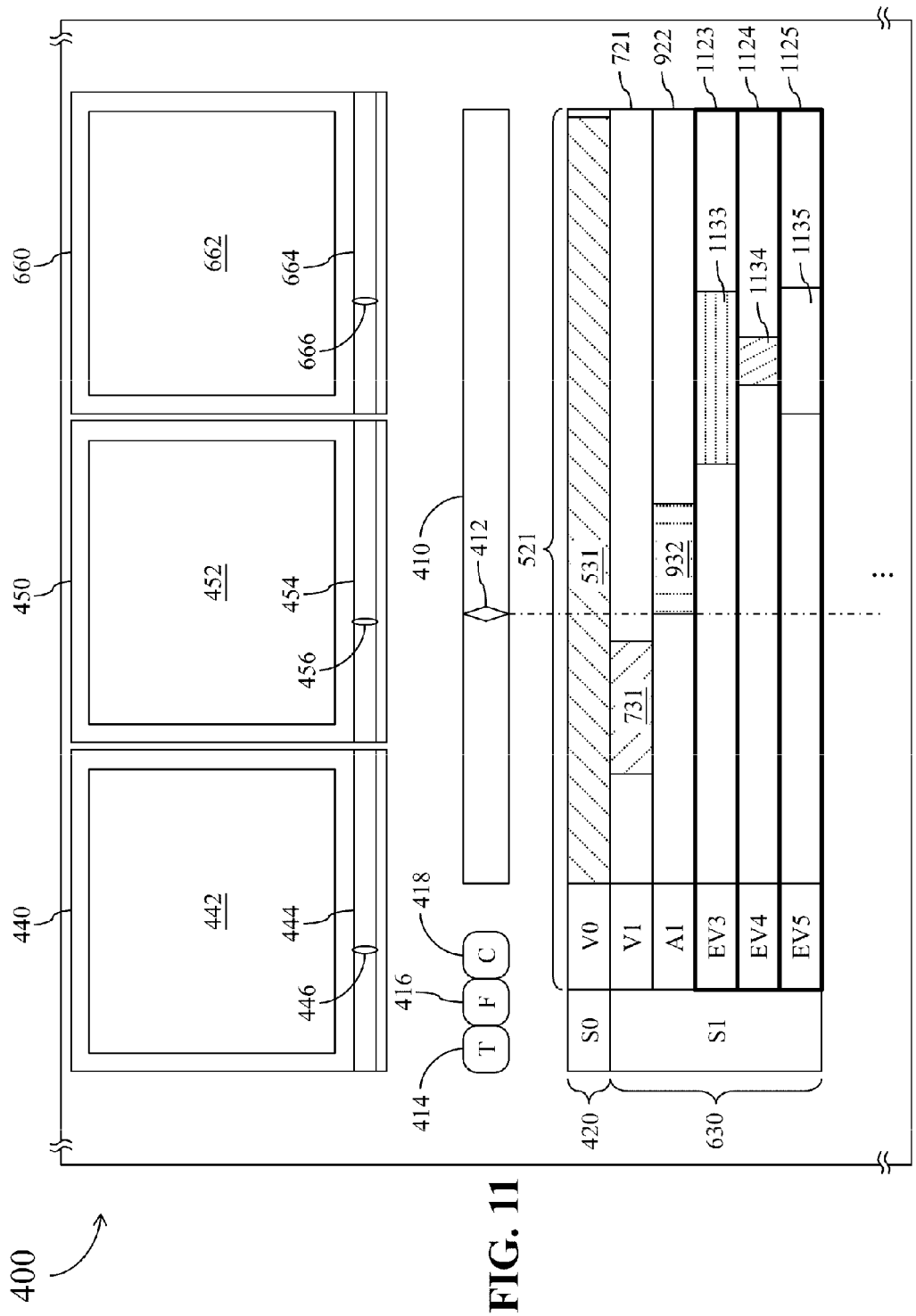

For example, as illustrated in FIG. 11, the event editing module 230 may display multiple auxiliary event blocks 1123~1125 corresponding to additional multiple auxiliary events in the first auxiliary device block 630, and respectively display corresponding multiple auxiliary event names EV3~EV5 and multiple auxiliary event graphs 1133~1135 respectively representing a total time length of respective auxiliary events in the auxiliary event blocks 1123~1125 according to the editor's manipulations to the input device 112. In practice, each of the auxiliary event blocks 1123~1125 may be an auxiliary video clip, an auxiliary audio clip, a vibration operation, a flashing operation, a URL address, or a user interaction operation. The user interaction operation refers to any kind of dialogue blocks for interacting with the user or refers to application program for requesting the user to input specific data.

Similarly, the editor is allowed to configure playback timing correlation among the main video clip and other auxiliary events with respect to a specific time point by moving the time marker 412 on the timeline 410, clicking related objects of relevant events, and using the aforementioned manipulations.

Figure 12:
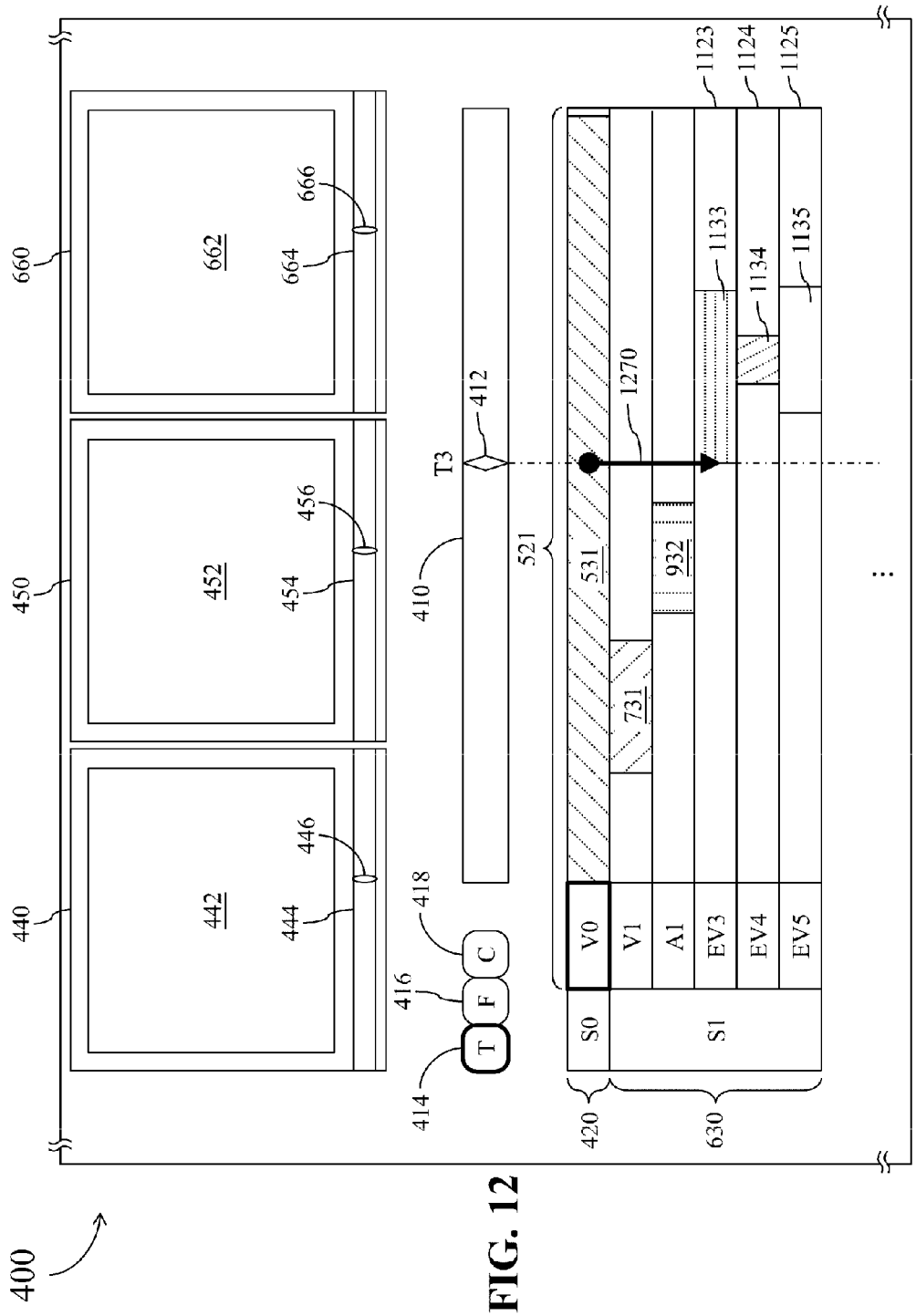

For example, as illustrated in FIG. 12, the editor may conduct the manipulations described previously to instruct the timing correlation setting module 250 to utilize the control circuit 115 to establish a third trigger timing data for indicating that the first auxiliary display device has to begin playbacking the auxiliary event corresponding to the auxiliary event block 1123 when the main display device playbacks the main video clip to a third time point T3. Similarly, the timing correlation setting module 250 may place a third trigger indicator 1270 corresponding to the position of the third time point T3 between the main event block 521 and the auxiliary event block 1123, so that the editor is enabled to be aware of relevant events and triggering direction corresponding to the aforementioned third trigger timing data from the editing screen 400 in a very straightforward approach, thereby increasing the correctness and efficiency in editing the playback timing correlation.

In this embodiment, the editor is allowed to configure a selective playback timing correlation among multiple events with respect to a specific time point by moving the time marker 412 on the timeline 410, clicking related objects of relevant events, and conducting a set of predetermined manipulations through the input device 112.

For illustrative purpose, the operation of establishing a selective playback timing correlation among the multiple auxiliary events in the first auxiliary device block 630 with respect to a fourth time point T4 is taken as an example in the following.

For example, the editor may manipulate the input device 112 to instruct the playback timing correlation editing program 119 to move the time marker 412 on the timeline 410 to the position of the fourth time point T4. At this moment, as illustrated in FIG. 13, the time marker control module 240 moves the time marker 412 on the timeline 410 to the position of the fourth time point T4 according to the editor's manipulation to the input device 112.

Then, the editor may manipulate the input device 112 to select the multiple auxiliary events in the first auxiliary device block 630 to conduct subsequent timing correlation editing operation.

Figure 13:
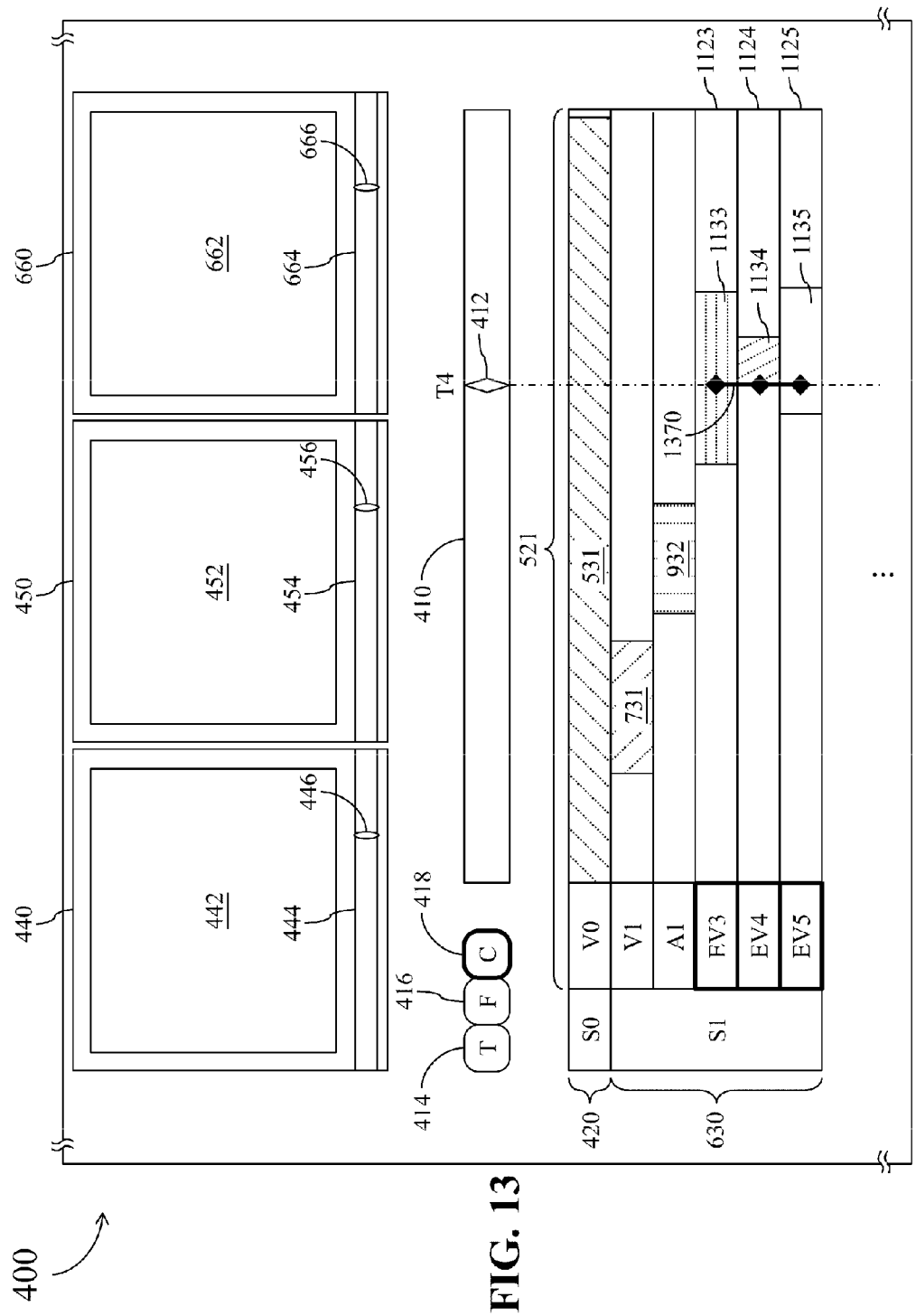

For example, in the embodiment of FIG. 13, when the editor manipulates the input device 112 to together select the multiple auxiliary event names EV3~EV5 or the multiple auxiliary event blocks 1123~1125 in the first auxiliary device block 630, the event editing module 230 configures the auxiliary event blocks 1123~1125 to have a highlighted pattern at the same time, so that the editor can be aware of that the currently selected events are the multiple auxiliary events corresponding to the auxiliary event blocks 1123~1125. The event editing module 230 may highlight the visual presentation of the auxiliary event blocks 1123~1125 in the way described previously, and thus related operations will be omitted here.

Then, the editor is allowed to establish the selective playback timing correlation among the multiple auxiliary events with respect to the fourth time point T4 by conducting a third set of predetermined manipulations through the input device 112.

For example, in the embodiment of FIG. 13, when the auxiliary event blocks 1123~1125 are configured to have the highlighted pattern, and the time marker 412 is located at the position of the fourth time point T4 on the timeline 410, the aforementioned third set of predetermined manipulations comprise clicking the command setting button 418 to the command setting module 260 to display a command input window (not shown) in the editing screen 400, and configuring the multiple auxiliary events as an event group through the command input window.

In this embodiment, if the editor configures the multiple auxiliary events as an event group through the command input window, the timing correlation setting module 250 utilizes the control circuit 115 to establish a fourth trigger timing data for indicating that the first auxiliary display device has to display a request message requesting a user to select one of the multiple auxiliary events when the main display device playbacks the main video clip to the fourth time point T4.

In another embodiment, the aforementioned third set of predetermined manipulations comprise pressing a third set of predetermined hotkeys (e.g., a key combination having equivalent function as the aforementioned command setting button 418) on the input device 112 to trigger the command setting module 260 to display the aforementioned command input window in the editing screen 400, and configuring the multiple auxiliary events as an event group through the command input window.

In another embodiment, the aforementioned third set of predetermined manipulations comprise forming a third set of finger print traces (e.g., a set of traces having equivalent function as pressing the aforementioned command setting button 418) on the input device 112 to trigger the command setting module 260 to display the aforementioned command input window in the editing screen 400, and configuring the multiple auxiliary events as an event group through the command input window.

In another embodiment, the aforementioned third set of predetermined manipulations comprise triggering the timing correlation setting module 250 to display a third menu containing a command setting option in the editing screen 400, selecting the command setting option from the third menu to trigger the command setting module 260 to display the aforementioned command input window in the editing screen 400, and configuring the multiple auxiliary events as an event group through the command input window. In practice, the timing correlation setting module 250 may utilize the display device 111 to display the aforementioned third menu in the editing screen 400 when triggered by the editor by clicking a predetermined button (e.g., a right button) on the input device 112, by long-clicking a specific portion on the input device 112, or by forming a set of specific finger print traces on the input device 112.

As shown in FIG. 13, the timing correlation setting module 250 may place a fourth trigger indicator 1370 corresponding to the position of the fourth time point T4 among the auxiliary event blocks 1123~1125, so that the editor is enabled to be aware of relevant events corresponding to the aforementioned fourth trigger timing data from the editing screen 400 in a very straightforward approach. Please note that the fourth trigger indicator 1370 contains multiple diamond symbols respectively positioned within the auxiliary event blocks 1123~1125, for enabling the editor to better understand the corresponding behavior of the fourth trigger timing data from the symbols of the fourth trigger indicator 1370 in a straightforward visual approach.

When the editor completes the timing correlation editing operation with the playback timing correlation editing program 119, the control circuit 115 of the timing correlation establishing device 110 may control the communication circuit 113 to transmit the aforementioned main video clip, the first auxiliary video clip, the first auxiliary audio clip, other multiple auxiliary events, and all corresponding trigger timing data (including the aforementioned first trigger timing data, the second trigger timing data, the third trigger timing data, and the fourth trigger timing data) to the transmission circuit 121 of the multi-screen playback controlling server 120. The processing circuit 125 of the multi-screen playback controlling server 120 stores the event data and trigger timing data received by the transmission circuit 121 into the database 123. Alternatively, the aforementioned main video clip, the first auxiliary video clip, the first auxiliary audio clip, other multiple auxiliary events, and all corresponding trigger timing data (including the aforementioned first trigger timing data, the second trigger timing data, the third trigger timing data, and the fourth trigger timing data) may be delivered to the multi-screen playback controlling server 120 by using any other data transmission approach, so that those data can be stored into the database 123.

When the multi-screen playback controlling server 120 wants to control the first video playback device 140 to cooperate with the second video playback device 150 to playback the aforementioned main video clip and related auxiliary events, the multi-screen playback controlling server 120 may transmit the main video clip to the first video playback device 140 for playbacking, and transmit the first auxiliary video clip, the first auxiliary audio clip, and other auxiliary events to the second video playback device 150.

While the first video playback device 140 playbacks the main video clip, the processing circuit 125 of the multi-screen playback controlling server 120 may control the second video playback device 150 to begin playbacking the first auxiliary video clip when the first video playback device 140 playbacks the main video clip to the first time point T1 according to the aforementioned first trigger timing data.

Similarly, the multi-screen playback controlling server 120 is also able to control the second video playback device 150 to begin playbacking the first auxiliary audio clip when the first video playback device 140 playbacks the main video clip to the second time point T2 according to the aforementioned second trigger timing data. The multi-screen playback controlling server 120 is also able to control the second video playback device 150 to begin executing the auxiliary event corresponding to the auxiliary event block 1123 when the first video playback device 140 playbacks the main video clip to the third time point T3 according to the aforementioned third trigger timing data.

In addition, the multi-screen playback controlling server 120 is also able to control the second video playback device 150 to display the aforementioned request message to request the user to select one of the multiple auxiliary events when the first video playback device 140 playbacks the main video clip to the fourth time point T4 according to the aforementioned fourth trigger timing data. In practice, if the user does not make the choice in a predetermined time period, the second video playback device 150 may execute one of the multiple auxiliary events according to a default rule, or may execute none of the multiple auxiliary events.

It can be appreciated from the foregoing descriptions, the disclosed playback timing correlation editing program 119 enables the editor to configure the playback timing correlation between contents to be playbacked by different display devices in a very straightforward approach, thereby providing significant benefit in reducing the complexity of editing the contents required for the multi-screen playback applications.

In addition, the trigger indicator generated by the timing correlation setting module 250 allows the editor to better understand the related events, triggering direction, or even the operation behavior corresponding to the specific trigger timing data in a straightforward visual approach, thereby greatly increasing the correctness and efficiency in editing the playback timing correlation.

In practice, for the same time point, the aforementioned main video clip may be configured to have different or identical playback timing correlation with multiple auxiliary events, so that the multi-screen multimedia playback system 100 is enabled to provide the audiences with more rich and more different experience in watching videos.

Additionally, when the editor manipulate the input device 112 to request to add more auxiliary device blocks corresponding to more auxiliary display devices in the editing screen 400, the device block control module 220 displays more corresponding auxiliary device blocks in the editing screen 400 for supporting the editor to configure the playback timing correlation among the main display device and more auxiliary display devices. In other words, the disclosed playback timing correlation editing program 119 allows the editor to simultaneously edit the playback timing correlation among the main display device and multiple auxiliary display devices. As a result, while the first video playback device 140 playbacks the main video clip, the multi-screen playback controlling server 120 is enabled to control more video playback devices (such as the aforementioned video playback device 160) to execute corresponding auxiliary events to cooperate with the first video playback device 140 according to the trigger timing data generated by the playback timing correlation editing program 119, so as to create more rich and more diversified video playback effects.

In some embodiments, the to-event setting button 414, the from-event setting button 416, and/or the command setting button 418 may be omitted from the editing screen 400 to simplify the image complexity of the editing screen 400.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A playback timing correlation editing method for controlling a timing correlation establishing device to establish playback timing correlation between contents to be playbacked by different playback devices, wherein the timing correlation establishing device comprises a display device, a input device, a communication circuit, and a control circuit, the method comprising:

utilizing the display device to display an editing screen containing a timeline;

displaying a main device block corresponding to a main display device in the editing screen;

when an editor requests to add a main video clip corresponding to the main display device through the input device, displaying a main event block corresponding to the main video clip in the main device block, and displaying a main event name corresponding to the main video clip and a main event graph representing a total time length of the main video clip in the main event block;

when the editor requests to add a device block though the input device, displaying a first auxiliary device block corresponding to a first auxiliary display device in the editing screen;

when the editor requests to add a first auxiliary video clip corresponding to the first auxiliary display device through the input device, displaying a first auxiliary event block corresponding to the first auxiliary video clip in the first auxiliary device block, and displaying a first auxiliary event name corresponding to the first auxiliary video clip and a first auxiliary event graph representing a total time length of the first auxiliary video clip in the first auxiliary event block;

displaying a time marker on a position of a first time point on the timeline according to the editor's manipulation to the input device;

when the editor selects the main event name or the main event graph through the input device, configuring the main event block to have a highlighted pattern; and when the time marker is located at the position of the first time point on the timeline, if the editor conducts a first set of predetermined manipulations through the input device, configuring the main video clip as a first trigger source event, configuring the first auxiliary video clip as a first trigger target event, and utilizing the control circuit to establish a first trigger timing data for indicating that the first auxiliary display device has to begin playbacking the first auxiliary video clip when the main display device playbacks the main video clip to the first time point.

2. The method of claim 1, further comprising:

utilizing the display device to display a to-event setting button in the editing screen;

wherein when the time marker is located at the position of the first time point on the timeline, if the editor firstly selects the main event block, then clicks the to-event setting button, and then clicks the first auxiliary event block through the input device, configuring the main video clip as the first trigger source event and configuring the first auxiliary video clip as the first trigger target event.

3. The method of claim 1, wherein when the time marker is located at the position of the first time point on the timeline, if the editor firstly selects the main event block through the input device, then triggers the timing correlation setting module to display a first menu containing a trigger target setting option in the editing screen, then selects the trigger target setting option from the first menu, and then clicks the first auxiliary event block, configuring the main video clip as the first trigger source event and configuring the first auxiliary video clip as the first trigger target event.

4. The method of claim 1, wherein when the time marker is located at the position of the first time point on the timeline, if the editor firstly selects the main event block through the input device, then presses a first set of predetermined hotkeys on the input device, and then clicks the first auxiliary event block, configuring the main video clip as the first trigger source event and configuring the first auxiliary video clip as the first trigger target event.

5. The method of claim 1, wherein when the time marker is located at the position of the first time point on the timeline, configuring the main video clip as the first trigger source event if the editor conducts a first set of manipulations related to the main event block through the input device, and configuring the first auxiliary video clip as the first trigger target event if the editor conducts a second set of manipulations related to the first auxiliary event block through the input device;

wherein the first set of manipulations are conducted before or after the second set of manipulations.

6. The method of claim 5, further comprising:

utilizing the display device to display a to-event setting button and a from-event setting button in the editing screen;

wherein the first set of manipulations comprise selecting the main event block and then clicking the from-event setting button, and the second set of manipulations comprise selecting the first auxiliary event block and then clicking the to-event setting button.

7. The method of claim 5, wherein the first set of manipulations comprise selecting the main event block, then triggering the display device to display a second menu containing a trigger source setting option in the editing screen, and then selecting the trigger source setting option from the second menu, and the second set of manipulations comprise selecting the first auxiliary event block, then triggering the display device to display a first menu containing a trigger target setting option in the editing screen, and then selecting the trigger target setting option from the first menu.

8. The method of claim 5, wherein the first set of manipulations comprise selecting the main event block and then pressing a second set of predetermined hotkeys on the input device, and the second set of manipulations comprise selecting the first auxiliary event block and then pressing a first set of predetermined hotkeys on the input device.

9. The method of claim 5, wherein the first set of manipulations comprise selecting the main event block and then forming a first set of finger print traces on the input device, and the second set of manipulations comprise selecting the first auxiliary event block and then forming a second set of finger print traces on the input device.

10. The method of claim 1, further comprising:

displaying a main device preview area corresponding to the main display device and a first auxiliary device preview area corresponding to the first auxiliary display device in the editing screen.

11. The method of claim 1, wherein the timing correlation establishing device transmits the main video clip, the first auxiliary video clip, and the first trigger timing data to a multi-screen playback controlling server in a multi-screen multimedia playback system, and the multi-screen playback controlling server transmits the main video clip to a first video playback device for playbacking, transmits the first auxiliary video clip to a second video playback device, and controls the second video playback device to begin playbacking the first auxiliary video clip when the first video playback device playbacks the main video clip to the first time point according to the first trigger timing data.

12. The method of claim 1, further comprising:

when the editor requests to add a first auxiliary audio clip corresponding to the first auxiliary display device through the input device, displaying a second auxiliary event block corresponding to the first auxiliary audio clip in the first auxiliary device block, and displaying a second auxiliary event name corresponding to the first auxiliary audio clip and a second auxiliary event graph representing a total time length of the first auxiliary audio clip in the second auxiliary event block;

moving the time marker to a position of a second time point on the timeline according to the editor's manipulation to the input device;

when the editor selects the second auxiliary event name or the second auxiliary event graph through the input device, configuring the second auxiliary event block to have a highlighted pattern; and when the time marker is located at the position of the second time point on the timeline, if the editor conducts a second set of predetermined manipulations through the input device, configuring the main video clip as a second trigger source event, configuring the first auxiliary audio clip as a second trigger target event, and utilizing the control circuit to establish a second trigger timing data for indicating that the first auxiliary display device has to begin playbacking the first auxiliary audio clip when the main display device playbacks the main video clip to the second time point.

13. The method of claim 12, wherein the timing correlation establishing device transmits the main video clip, the first auxiliary audio clip, and the second trigger timing data to a multi-screen playback controlling server in a multi-screen multimedia playback system, and the multi-screen playback controlling server transmits the main video clip to a first video playback device for playbacking, transmits the first auxiliary audio clip to a second video playback device, and controls the second video playback device to begin playbacking the first auxiliary audio clip when the first video playback device playbacks the main video clip to the second time point according to the second trigger timing data.

14. The method of claim 1, further comprising:
displaying multiple auxiliary event blocks corresponding to multiple auxiliary events in the first auxiliary device block according to the editor's manipulation to the input device, and respectively displaying corresponding multiple auxiliary event names and multiple auxiliary event graphs respectively representing a total time length of respective auxiliary events in the multiple auxiliary event blocks;
moving the time marker to a position of a fourth time point on the timeline according to the editor's manipulation to the input device;
configuring the multiple auxiliary event blocks to have a highlighted pattern at the same time according to the editor's manipulation to the input device; and
when the multiple auxiliary event blocks are configured to have the highlighted pattern and the time marker is located at the position of the fourth time point on the timeline, if the editor conducts a third set of predetermined manipulations through the input device, utilizing the control circuit to establish a fourth trigger timing data for indicating that the first auxiliary display device has to display a request message requesting a user to select one of the multiple auxiliary events when the main display device playbacks the main video clip to the fourth time point;
wherein each of the multiple auxiliary events is an auxiliary video clip, an auxiliary audio clip, a vibration operation, a flashing operation, a URL address, or a user interaction operation.

15. The method of claim 14, further comprising:
utilizing the display device to display a command setting button in the editing screen;
wherein the third set of predetermined manipulations comprise clicking the command setting button to trigger the display device to display a command input window in the editing screen, and configuring the multiple auxiliary events as an event group through the command input window.

16. The method of claim 14, wherein the third set of predetermined manipulations comprise pressing a third set of predetermined hotkeys on the input device to trigger the display device to display a command input window in the editing screen, and configuring the multiple auxiliary events as an event group through the command input window.

17. The method of claim 14, wherein the third set of predetermined manipulations comprise forming a third set of finger print traces on the input device to trigger the display device to display a command input window in the editing screen, and configuring the multiple auxiliary events as an event group through the command input window.

18. The method of claim 14, wherein the third set of predetermined manipulations comprise triggering the display device to display a third menu containing a command setting option in the editing screen, selecting the command setting option from the third menu to trigger the display device to display a command input window in the editing screen, and configuring the multiple auxiliary events as an event group through the command input window.

19. The method of claim 14, wherein the timing correlation establishing device transmits the main video clip, the multiple auxiliary events, and the fourth trigger timing data to a multi-screen playback controlling server in a multi-screen multimedia playback system, and the multi-screen playback controlling server transmits the main video clip to a first video playback device for playbacking, transmits the multiple auxiliary events to a second video playback device, and controls the second video playback device to display the request message when the first video playback device playbacks the main video clip to the fourth time point according to the fourth trigger timing data.

20. A computer program product, stored in a non-transitory storage device, for controlling a timing correlation establishing device to establish playback timing correlation between contents to be playbacked by different playback devices, wherein the timing correlation establishing device comprises a display device, a input device, a communication circuit, and a control circuit, the computer program product comprising:
an editing screen generating module for utilizing the display device to display an editing screen containing a timeline;
a device block control module for displaying a main device block corresponding to a main display device in the editing screen;
an event editing module, wherein when an editor requests to add a main video clip corresponding to the main display device through the input device, the event editing module displays a main event block corresponding to the main video clip in the main device block, and displays a main event name corresponding to the main video clip and a main event graph representing a total time length of the main video clip in the main event block;
a time marker control module; and
a timing correlation setting module;
wherein when the editor requests to add a device block though the input device, the device block control module displays a first auxiliary device block corresponding to a first auxiliary display device in the editing screen;
wherein when the editor requests to add a first auxiliary video clip corresponding to the first auxiliary display device through the input device, the event editing module displays a first auxiliary event block corresponding to the first auxiliary video clip in the first auxiliary device block, and displays a first auxiliary event name corresponding to the first auxiliary video clip and a first auxiliary event graph representing a total time length of the first auxiliary video clip in the first auxiliary event block;
wherein the time marker control module displays a time marker on a position of a first time point on the timeline according to the editor's manipulation to the input device;
wherein when the editor selects the main event name or the main event graph through the input device, the event editing module configures the main event block to have a highlighted pattern;
wherein when the time marker is located at the position of the first time point on the timeline, if the editor conducts a first set of predetermined manipulations through the input device, the timing correlation setting module configures the main video clip as a first trigger source event, configures the first auxiliary video clip as a first trigger target event, and utilizes the control circuit to establish a first trigger timing data for indicating that the first auxiliary display device has to begin playbacking the first auxiliary video clip when the main display device playbacks the main video clip to the first time point.

21. The computer program product of claim 20, wherein the editing screen generating module further displays a to-event setting button in the editing screen;
wherein when the time marker is located at the position of the first time point on the timeline, if the editor firstly selects the main event block, then clicks the to-event setting button, and then clicks the first auxiliary event block through the input device, the timing correlation setting module configures the main video clip as the first trigger source event and configures the first auxiliary video clip as the first trigger target event.

22. The computer program product of claim 20, wherein when the time marker is located at the position of the first time point on the timeline, if the editor firstly selects the main event block through the input device, then triggers the timing correlation setting module to display a first menu containing a trigger target setting option in the editing screen, then selects the trigger target setting option from the first menu, and then clicks the first auxiliary event block, the timing correlation setting module configures the main video clip as the first trigger source event and configures the first auxiliary video clip as the first trigger target event.

23. The computer program product of claim 20, wherein when the time marker is located at the position of the first time point on the timeline, if the editor firstly selects the main event block through the input device, then presses a first set of predetermined hotkeys on the input device, and then clicks the first auxiliary event block, the timing correlation setting module configures the main video clip as the first trigger source event and configures the first auxiliary video clip as the first trigger target event.

24. The computer program product of claim 20, wherein when the time marker is located at the position of the first time point on the timeline, the timing correlation setting module configures the main video clip as the first trigger source event if the editor conducts a first set of manipulations related to the main event block through the input device, and the timing correlation setting module configures the first auxiliary video clip as the first trigger target event if the editor conducts a second set of manipulations related to the first auxiliary event block through the input device;
wherein the first set of manipulations are conducted before or after the second set of manipulations.

25. The computer program product of claim 24, wherein the editing screen generating module further displays a to-event setting button and a from-event setting button in the editing screen;
wherein the first set of manipulations comprise selecting the main event block and then clicking the from-event setting button, and the second set of manipulations comprise selecting the first auxiliary event block and then clicking the to-event setting button.

26. The computer program product of claim 24, wherein the first set of manipulations comprise selecting the main event block, then triggering the timing correlation setting module to display a second menu containing a trigger source setting option in the editing screen, and then selecting the trigger source setting option from the second menu, and the second set of manipulations comprise selecting the first auxiliary event block, then triggering the timing correlation setting module to display a first menu containing a trigger target setting option in the editing screen, and then selecting the trigger target setting option from the first menu.

27. The computer program product of claim 24, wherein the first set of manipulations comprise selecting the main event block and then pressing a second set of predetermined hotkeys on the input device, and the second set of manipulations comprise selecting the first auxiliary event block and then pressing a first set of predetermined hotkeys on the input device.

28. The computer program product of claim 24, wherein the first set of manipulations comprise selecting the main event block and then forming a first set of finger print traces on the input device, and the second set of manipulations comprise selecting the first auxiliary event block and then forming a second set of finger print traces on the input device.

29. The computer program product of claim 20, wherein the device block control module further displays a main device preview area corresponding to the main display device and a first auxiliary device preview area corresponding to the first auxiliary display device in the editing screen.

30. The computer program product of claim 20, wherein the timing correlation establishing device transmits the main video clip, the first auxiliary video clip, and the first trigger timing data to a multi-screen playback controlling server in a multi-screen multimedia playback system, and the multi-screen playback controlling server transmits the main video clip to a first video playback device for playbacking, transmits the first auxiliary video clip to a second video playback device, and controls the second video playback device to begin playbacking the first auxiliary video clip when the first video playback device playbacks the main video clip to the first time point according to the first trigger timing data.

31. The computer program product of claim 20, wherein:
when the editor requests to add a first auxiliary audio clip corresponding to the first auxiliary display device through the input device, the event editing module displays a second auxiliary event block corresponding to the first auxiliary audio clip in the first auxiliary device block, and displays a second auxiliary event name corresponding to the first auxiliary audio clip and a second auxiliary event graph representing a total time length of the first auxiliary audio clip in the second auxiliary event block;
the time marker control module further moves the time marker to a position of a second time point on the timeline according to the editor's manipulation to the input device;
when the editor selects the second auxiliary event name or the second auxiliary event graph through the input device, the event editing module configures the second auxiliary event block to have a highlighted pattern; and
when the time marker is located at the position of the second time point on the timeline, if the editor conducts a second set of predetermined manipulations through the input device, the timing correlation setting module configures the main video clip as a second trigger source event, configures the first auxiliary audio clip as a second trigger target event, and utilizes the control circuit to establish a second trigger timing data for indicating that the first auxiliary display device has to begin playbacking the first auxiliary audio clip when the main display device playbacks the main video clip to the second time point.

32. The computer program product of claim 31, wherein the timing correlation establishing device transmits the main video clip, the first auxiliary audio clip, and the second trigger timing data to a multi-screen playback controlling server in a multi-screen multimedia playback system, and the multi-screen playback controlling server transmits the main video clip to a first video playback device for playbacking, transmits the first auxiliary audio clip to a second video playback device, and controls the second video playback device to begin playbacking the first auxiliary audio clip when the first video playback device playbacks the main video clip to the second time point according to the second trigger timing data.

33. The computer program product of claim 20, wherein:
the event editing module further displays multiple auxiliary event blocks corresponding to the multiple auxiliary events in the first auxiliary device block according to the editor's manipulation to the input device, and respectively displays corresponding multiple auxiliary event names and multiple auxiliary event graphs respectively representing a total time length of respective auxiliary events in the multiple auxiliary event blocks;
the time marker control module further moves the time marker to a position of a fourth time point on the timeline according to the editor's manipulation to the input device;
the event editing module configures the multiple auxiliary event blocks to have a highlighted pattern at the same time according to the editor's manipulation to the input device; and
when the multiple auxiliary event blocks are configured to have the highlighted pattern and the time marker is located at the position of the fourth time point on the timeline, if the editor conducts a third set of predetermined manipulations through the input device, the timing correlation setting module utilizes the control circuit to establish a fourth trigger timing data for indicating that the first auxiliary display device has to display a request message requesting a user to select one of the multiple auxiliary events when the main display device playbacks the main video clip to the fourth time point;
wherein each of the multiple auxiliary events is an auxiliary video clip, an auxiliary audio clip, a vibration operation, a flashing operation, a URL address, or a user interaction operation.

34. The computer program product of claim 33, further comprising a command setting module;
wherein the editing screen generating module further utilizes the display device to display a command setting button in the editing screen, and the third set of predetermined manipulations comprise clicking the command setting button to trigger the command setting module to display a command input window in the editing screen, and configuring the multiple auxiliary events as an event group through the command input window.

35. The computer program product of claim 33, further comprising a command setting module;
wherein the third set of predetermined manipulations comprise pressing a third set of predetermined hotkeys on the input device to trigger the command setting module to display a command input window in the editing screen, and configuring the multiple auxiliary events as an event group through the command input window.

36. The computer program product of claim 33, further comprising a command setting module;
wherein the third set of predetermined manipulations comprise forming a third set of finger print traces on the input device to trigger the command setting module to display a command input window in the editing screen, and configuring the multiple auxiliary events as an event group through the command input window.

37. The computer program product of claim 33, further comprising a command setting module;
wherein the third set of predetermined manipulations comprise triggering the timing correlation setting module to display a third menu containing a command setting option in the editing screen, selecting the command setting option from the third menu to trigger the command setting module to display a command input window in the editing screen, and configuring the multiple auxiliary events as an event group through the command input window.

38. The computer program product of claim 33, wherein the timing correlation establishing device transmits the main video clip, the multiple auxiliary events, and the fourth trigger timing data to a multi-screen playback controlling server in a multi-screen multimedia playback system, and the multi-screen playback controlling server transmits the main video clip to a first video playback device for playbacking, transmits the multiple auxiliary events to a second video playback device, and controls the second video playback device to display the request message when the first video playback device playbacks the main video clip to the fourth time point according to the fourth trigger timing data.

* * * * *